United States Patent [19]

Brick

[11] Patent Number: 4,755,904
[45] Date of Patent: Jul. 5, 1988

[54] LIGHTNING PROTECTION SYSTEM FOR CONDUCTIVE COMPOSITE MATERIAL STRUCTURE

[75] Inventor: Rowan O. Brick, Bellevue, Wash.
[73] Assignee: The Boeing Company, Seattle, Wash.
[21] Appl. No.: 871,717
[22] Filed: Jun. 6, 1986
[51] Int. Cl.$^4$ ............................................ H05F 1/02
[52] U.S. Cl. ................................... 361/117; 361/218; 244/1 A
[58] Field of Search ..................... 361/117, 216–218; 244/1 A, 121, 125, 126, 136

[56] References Cited

U.S. PATENT DOCUMENTS

| | | | |
|---|---|---|---|
| Re. 25,417 | 7/1963 | Amason | 244/1 |
| 3,283,210 | 11/1966 | Welsh | 317/2 |
| 3,532,932 | 10/1970 | Simon | 317/2 |
| 3,755,713 | 8/1973 | Paszkowski | 317/2 |
| 3,906,308 | 9/1975 | Amason et al. | 317/2 |
| 3,989,984 | 11/1976 | Amason et al. | 317/2 |
| 4,221,152 | 9/1980 | Jason | 85/7 |
| 4,237,514 | 12/1980 | Cline | 361/117 |
| 4,352,142 | 9/1982 | Olson | 361/218 |
| 4,405,256 | 9/1983 | King, Jr. | 403/408 |
| 4,429,341 | 1/1984 | King | 361/117 |
| 4,448,838 | 5/1984 | McClenahan et al. | 428/251 |
| 4,472,096 | 9/1984 | Ruhl et al. | 411/43 |
| 4,479,163 | 10/1984 | Bannink, Jr. et al. | 361/218 |
| 4,502,092 | 2/1985 | Bannink, Jr. et al. | 261/218 |
| 4,522,889 | 6/1985 | Ebneth et al. | 428/614 |
| 4,542,056 | 9/1985 | Anglin et al. | 428/116 |

OTHER PUBLICATIONS

"Fastening Composite Structures with HUCK Fasteners", Joseph L. Phillips, HUCK Technical Paper, HUCK Manufacturing Company, 1984, pp. 18–20.
HUCK Catalogue, Form #CA132, Feb. 1985.
Aviation Week, Jun. 25, 1984, p. 105, (Advertisement).
User's Manual for AC-20-53A Protection of Airplane Fuel Systems Against Fuel Vapor Ignition Due to Lightning; Rasch, N., FAA Technical Center, Oct. 1984, (Cover and Documentation Pages and pp. 31–35).
Parts I and II of Technical Report AFML-TR-70-303, entitled "Coatings for Lightning Protection of Structural Reinforced Plastics", by R. O. Brick, C.H. King, and J. T. Quinlivan, Part I, Mar. 1971; pp. iii, 1–10, 15 & 104; Part II, Feb. 1972; pp. 1, 2–7, 36 & 37.

Primary Examiner—A. D. Pellinen
Assistant Examiner—Todd E. DeBoer
Attorney, Agent, or Firm—Joan H. Pauly

[57] ABSTRACT

A composite material skin (42) is attached to a composite material support structure (26) by a plurality of metal lock bolts (64). A foraminous metal material (44) is embedded in the matrix of the outer layer of the skin (42) and positioned outwardly of reinforcing graphite fibers. The metal (44) is preferably copper in a knitted, woven, or expanded metal configuration. The metal (44) is in direct electrical contact with the graphite fibers to disperse current throughout the skin (42) and is sufficiently proximate to the lock bolts (64) to divert current away from the bolts (64). Each bolt (64) is surrounded by an expanded sleeve (74) and fits tightly within the sleeve (74) to provide good electrical contact between the bolt (64) and the skin (42). The inner end (70) of the bolt (64) has parallel grooves (72) thereon, and a collar (76) is swaged onto the end (70) to prevent arc plasma from escaping into the interior of the aircraft. The inner end of a removable threaded fastener (28) is sealed by a dielectric cap (86). A ground stud (92) is provided with an expanded sleeve (74″) and a collar (76).

17 Claims, 6 Drawing Sheets

LIGHTNING PROTECTION SYSTEM FOR CONDUCTIVE COMPOSITE MATERIAL STRUCTURE

DESCRIPTION

1. Technical Field

This invention relates to lightning protection systems and, more particularly, to such a system for protecting conductive composite material aircraft structures that includes multipath lightning protection in areas where both fuel vapor and the possibility of lightning attachment are present, that includes a layer of foraminous metal material embedded in the composite material matrix and in electrical contact with conductive fibers of the composite material for dispersing current from a lightning strike, and that has means for preventing arc plasma blow-by from around fasteners.

2. Background Art

Conventional aluminum aircraft structures typically have inherent lightning protection. An aluminum skin has uniform and predictable material properties including excellent electrical conductivity. Thus, protection against skin puncture by lightning can be provided simply by sizing the skin thickness. In addition, in conventional installations, there is a very low electrical resistance at fastener/aluminum skin interfaces, and this low resistance allows very high current transfer to occur with minimal heating. This high current transfer capability prevents the extremely high current densities that are produced at a fastener-to-skin interface when a lightning channel attaches to a fastener head from causing sparking around the fastener. Such sparking would present a danger of ignition of materials inside the aircraft skin.

Providing lightning protection for conductive composite material structures, such as carbon fiber reinforced plastics, is much more difficult and complicated than providing protection for aluminum structures. Conductive composite materials are nonhomogeneous and are considerably less conductive than aluminum. In some structures, the skin may be sized to resist puncture and hot spot ignition hazards, but the structure is still subject to skin surface damage and sparking or arc plasma blow-by around fastener installations.

Figure 6:
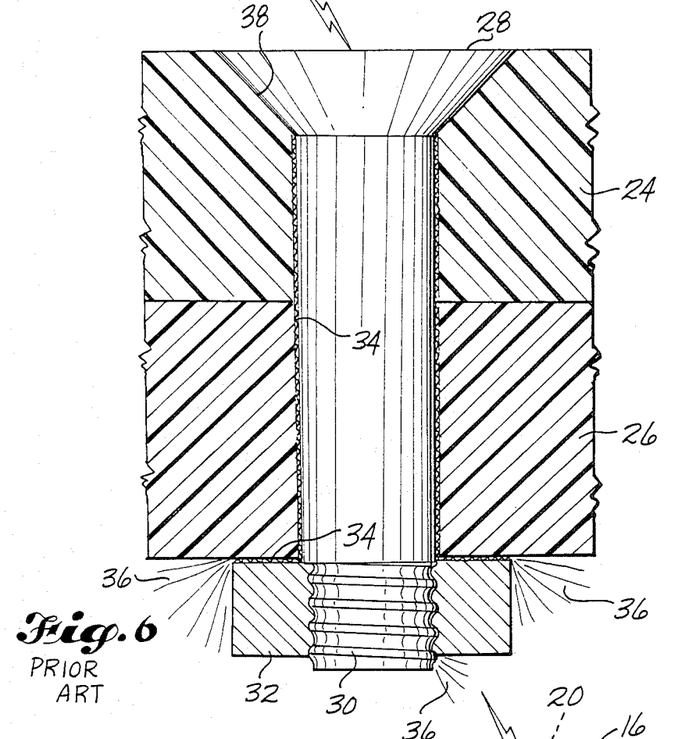
FIG. 6 is a sectional view of a conventional fastener installation, with the fastener shown in elevation.

Because of the difference in conductivity between the fastener material and the conductive fibers in the composite material, the electrical resistance at a fastener/composite material skin interface is very high. The usual requirement that fasteners be installed in clearance-fit holes to prevent fiber delamination results in gaps between the fastener and the composite material which further increase electrical resistance. The resistance may be more than one thousand times the resistance at a fastener/aluminum skin interface. The high resistance causes arcing and the formation of hot arc plasma along the interface between the composite material and the fastener countersink and shank areas. When there is a high current density at the interface and thus a high level of arc plasma generated, the pressure in the interface area becomes considerable and results in arc plasma blow-by. This phenomenon is illustrated in FIG. 6 which shows arc plasma being forced by the pressure in the shank interface area out from the interface area into an interior portion of the aircraft. The arc plasma blows out along the spiral paths created by the threads of the threaded fastener and between the fastener nut and the support structure. The arc plasma blow-by and accompanying spark displays can ignite flammable substances inside the aircraft structure and are especially hazardous when fuel vapor is present inside the structure, such as in a wing fuel tank.

In known installations of fasteners in conductive composite materials, the lack of good contact between the fastener and the composite material also causes nonuniform transfer of current from the fastener to the composite material. This nonuniform transfer can result in very high current densities in individual graphite fibers. Such fibers may be exposed to the interior of the structure due to a defect in the composite material or fiber breakout resulting from drilling a hole in the composite material for receiving the fastener. An exposed fiber with a high current density may become glowing hot or spark and, therefore, presents an additional ignition hazard.

There are a number of possible solutions to the problem of providing lightning protection for conductive composite materials like carbon fiber reinforced plastic. One approach would be to provide an insulative overlay that covers one hundred percent of the graphite surface to prevent lightning attachment to the surface, or to provide a dielectric covering over fastener heads or fastener heads and adjacent skin surfaces to prevent lightning attachment to the fasteners. This approach would have a number of drawbacks. Insulative outer layers are difficult to apply and maintain. Any discontinuity in the installation, even small pin holes, can destroy the effectiveness of the protection. Small pin holes and punctures would generally escape detection using normal inspection procedures, and therefore, costly and time consuming special inspection procedures would be required to ensure the integrity of the insulation. In addition, it would be difficult to make corrosion compatible repairs of any discontinuities that were discovered.

Another possible approach to providing lightning protection is to provide a highly conductive outer layer on the composite material structure. One way of doing this would be to provide a sheet metal or foil overlay or metal strips on the outside surface of the composite material. This method would have the serious disadvantage of being subject to resin or air entrapment and a consequent lack of good electrical contact between the metal and the graphite of the composite material. Another method of providing a conductive outer layer would be to provide an aluminum flame spray electrically and corrosion isolated from the graphite. The corrosion isolation would be necessary because aluminum and graphite are galvanically incompatible. This means that, in a corrosion environment, electrolytic action occurs between aluminum and graphite, forming corrosion and thereby impairing the electrical conductivity of the aluminum. The galvanic incompatibility between aluminum and graphite would make it difficult to make corrosion compatible repairs in an aluminum flame spray coating. In addition, since the coating would be electrically isolated from the graphite structure, it would have to be thicker and heavier to be capable of conducting lightning currents. The relatively heavy weight of the coating and the added weight of the electrical and corrosion isolating material would be a serious disadvantage in an aircraft environment. Flame sprays also have the disadvantages of being relatively difficult to apply and of requiring a high level of maintenance since they are subject to cracking and peeling. Varying the method by providing a wire mesh or similar material over a dielectric instead of the isolated flame spray would avoid some of the maintenance problems but would not solve the weight and corrosion compatible repair problems.

Another possible method of increasing the conductivity of the outer surface of a composite material to provide lightning protection is to incorporate metallic material into the outer ply or plies of the composite material. This can be done, for example, by coating some or all of the fibers of graphite cloth with metal, by weaving metal wire into graphite cloth, or by incorporating wire into a unidirectional ply of composite material tape with the wire extending in the same direction as the graphite fibers. Each of these approaches would have a number of drawbacks.

During a procedure for coating graphite or other fibers, the amount of metal deposited on the fibers cannot be cost effectively controlled, and following the coating procedure, the amount of metal actually deposited cannot easily be determined by normal inspection procedures. Thus, the conductivity of the coated fibers cannot be accurately controlled or measured. In addition, coated fibers, as opposed to metal wire, do not efficiently provide conductivity per unit weight.

Incorporating either coated fibers or woven wire into the outer structural plies of a composite material would compromise the integrity of the outer plies and degrade the structural properties of the composite material. Moreover, weaving coated fibers or metal wire into a structural ply would be relatively complicated and expensive. Thus, incorporating woven conductors would tend to be inefficient in terms of providing the required conductivity while minimizing expense and weight penalties. Further disadvantages of incorporating metal conductors into structural plies would be that lightning damage caused by the high pressures generated by vaporization of the metal would tend to penetrate deeper into the structural plies; and when the metal was all or partially aluminum, the electrical conductivity would degrade in a corrosion environment, and it would be difficult to make corrosion compatible repairs.

The weaving of coated fibers or wire into a structural layer would not work well with unidirectional fiber tape construction techniques or filament winding techniques because the weaving of the structural fibers would cause them to have a wavy rather than a straight configuration. This change in configuration would degrade the structural capabilities of the fibers. The result would be outer layers in which both structural efficiency and conductive efficiency, have been comprised. Incorporating wire in plies of tape in the same direction as the reinforcing fibers would avoid some of these problems, but would do so at a high cost. Since the metallic conductors would not be electrically cross-connected, unacceptable lightning damage would be produced in long narrow lines along the wire lengths. This kind of damage pattern would be difficult and costly to repair. The cross-connected grids of woven conductors would be required to produce circular damage areas that would be easier to repair.

Lightning protection systems for aircraft are disclosed in U.S. Pat. Nos. Re. 25,417, issued July 16, 1963, to M. P. Amason; 3,755,713, granted Aug. 28, 1973, to J. B. Paszkowski; 3,906,308, granted Sept. 16, 1975, to M. P. Amason et al., 3,989,984, granted Nov. 2, 1976, to M. P. Amason et al., 4,237,514, granted Dec. 2, 1980, to J. D. Cline; 4,352,142, granted Sept. 28, 1982, to G. O. Olson; 4,429,341, granted Jan. 31, 1984, to C. H. King; 4,448,838, granted May 15, 1984, to D. H. McClenahan et al.; 4,479,163, granted Oct. 23, 1984, to E. T. Bannink, Jr. et al.; 4,502,092, granted Feb. 26, 1985, to E. T. Bannink, Jr. et al., 4,522,889, granted June 11, 1985, to H. Ebeth et al.; and 4,542,056, granted Sept. 17, 1985, to J. M. Anglin et al. Olson discloses a replaceable outer sandwich structure of aluminum foil with a dielectric core. Ebneth et al. disclose a highly conductive composite material for lightning protection. The material includes woven carbon or aramid fibers coated with nickel and copper.

Paszkowski discloses a system for controlling electrostatic charges and protecting a nonconductive composite panel or aerodynamic surface in a metal aircraft from vulnerability to lightning strikes. The system includes aluminum mesh wire embedded in resin on the outer surface of the panel. The wire mesh extends around the edges of the panel at interfaces with the metal structure and is described as being of the same material as the remainder of the aircraft in order to prevent corrosion. Threaded metal fasteners are shown extending through the wire mesh containing layer, with the mesh extending around the end of the panel and along its inner surface past the fastener or extending into the nonconductive composite material from the upper surface along the countersink area of the fastener.

In U.S. Pat. No. 3,989,984, Amason et al. disclose an outer protective layer of metal, which may be a wire screen, over a dielectric. The protective layer is provided with apertures to allow for resin bleeding during the bonding and curing process. At joints where the composite material panel is joined to other structures, an electrical path to an internal ground structure is provided. The path includes a section of the perforated metal, which is abutted by a nonflush head of a fastener or a nonflush flange of a countersunk washer, and a bushing and/or metal plate surrounding the fastener. Amason et al. also disclose a composite panel that does not have the lightning protection outer layer of metal and dielectric and that is tightly bolted to a metal or composite panel by a conductive countersunk washer, bolt, and nut. The interface between the two panels is provided either with conductive enhancement or a thin dielectric film.

McClenahan et al. disclose a graphite fiber reinforced laminate structure having at least one graphite fiber ply with metal wire or metal coated filaments woven therein in the warp and fill directions. The metal wire or coated filament is described as being compatible or capable of being made compatible with graphite. McClenahan et al. state that, when the laminate is painted or other steps are taken to protect the wire from moisture and inhibit galvanic action, aluminum wire is the preferred material. The interwoven wire or coated filaments are described as reducing the percentage of current that enters the inner plies of graphite and thereby reducing damage to the inner plies. McClenahan et al. state that some of the wires near the first lightning attachment point will vaporize where exposed to the surface, burst through the paint, and promote additional attachment points.

The two Bannink, Jr. et al. patents disclose nickel plated fibers woven into an outer graphite/epoxy ply. A fastener extending through the composite material panel is isolated from the outer conductive ply by a potting compound filling the counterbore above its head. In one embodiment, the fastener is also isolated by a dielectric patch that extends over the potting compound and surrounding portions of the metallized ply and by a glass fiber insert that surrounds the shaft of the fastener.

The 1985 Bannink, Jr. et al. patent issued on an application that was a continuation-in-part of the application on which the 1984 patent issued. The 1985 patent discloses four additional embodiments of the lightning protection system, each of which includes a conductive outer ply of the composite material skin. In two of the additional embodiments, the fastener head appears to be in contact with the conductive outer ply, the fastener shaft is isolated from the inner plies by a nonconductive bushing, and there is no dielectric patch or potting compound over the fastener head. The primary purpose of the bushing is to prevent current from entering the inner plies through the metal fastener. The fastener is also isolated from an electrically conductive substructural member by a nonconductive angle to which the composite skin is attached by the fastener, or by the bushing, a nonconductive layer between the skin and a conductive angle, and a nonconductive washer.

In the other two embodiments, the system includes a dielectric patch extending over the fastener head and surrounding portions of the conductive outer ply and a nonconductive member between the fastener and an electrically conductive substructural member. The dielectric patch is described as preventing direct lightning attachment to the fastener so that the lightning will disperse into the structure through the metal-containing outer layer. There is no isolation between the fastener and any of the plies of the composite material skin, including the conductive outer ply. The inner end of the fastener is engaged by a "shear collar". With reference to one of the last two described embodiments in which the nonconductive member is a nonconductive angle to which the composite material skin is attached, the nonconductive angle is described as preventing current from flowing into the substructure to prevent arcing between the angle and the skin or the angle and the substructural member to which it is attached.

Anglin et al. disclose a composite structure having a honeycomb core and a plurality of fiberglass plies. In the outer layer of the structure, the fiberglass fabric includes yarn coated with aluminum. Additional plies of coated-yarn-containing fiberglass fabric are provided around fastener areas for increased electrical continuity.

The use of conductive outer coatings on composite material skins to protect the composite material from structural damage by lightning strikes is disclosed in Parts I and II of Technical Report AFML-TR-70-303, entitled "Coatings for Lightning Protection of Structural Reinforced Plastics", and authored by the present applicant and C. H. King and J. T. Quinlivan. The report discusses studies and testing related to preventing damage to the composite material itself, as opposed to internal ignition hazards. The coatings discussed include wire mesh embedded in the epoxy matrix. One conclusion of the report is that a thin dielectric layer between the wire mesh and the underlying composite structure improves the performance of the system.

Apparatus for discharging static electricity is disclosed by U.S. Pat. Nos. 3,283,210, granted Nov. 1, 1966, to M. V. Welsh, and 3,532,932, granted Oct. 6, 1970, to J. Casas Simon. The apparatus disclosed by Casas Simon is designed for use in textile machines and includes a thin body of metal mesh embedded in insulating material and connected to a ground.

U.S. Pat. No. 4,405,256, granted Sept. 20, 1983, to J. O. King, Jr., discloses a method of forming a fastener joint in a composite material workpiece subject to an operating load. A sleeve is expanded inside a hole in the workpiece to compress a cushion against the sidewalls of the hole, and then the fastener is inserted. The compressed cushion layer and the sleeve transmit the operating load from the workpiece to the fastener.

The above patents and the prior art that is discussed and/or cited therein should be studied for the purpose of putting the present invention into proper perspective relative to the prior art.

DISCLOSURE OF THE INVENTION

This invention is directed toward providing an improved lightning protection system for aircraft. According to an aspect of the invention, the system comprises the combination of an internal support structure, a composite material structure, and conductive fastener means for securing the composite material structure to the support structure. The composite material structure includes an integral resin matrix and reinforcing conductive fibrous material embedded in the matrix. The fibrous material is sufficiently strong to provide predetermined load-carrying characteristics. A foraminous metal material is embedded in the matrix and is positioned outwardly of the fibrous material in an outer layer of the composite material structure that will be subject to attachment of lightning. The metal material is more conductive than and galvanically compatible with the fibrous material and is dimensioned to help maximize the conductivity per unit weight and minimize the weight of the outer layer of the composite material. The metal material forms interconnecting electrical pathways to disperse current from lightning over the outer layer of the composite material structure and is sufficiently proximate to the fastener means to divert current from lightning that attaches to the fastener means away from the fastener means. In addition, the metal material is in direct electrical contact with the fibrous material to disperse current throughout the composite material structure. When the fastener means comprises a plurality of conductive fasteners, the metal material preferably forms interconnecting electrical pathways that are sufficiently proximate to the fasteners to cause current from lightning that attaches to one of the fasteners to be shared by the other fasteners.

In the protection system of the invention, the foraminous metal material provides several different forms of lightning protection. By dispersing current, the metal material helps protect the composite material structure against skin puncture and surface damage and prevent the creation of hot spot ignition hazards. By diverting current away from fasteners and dispersing current, the metal material also reduces the current densities at the fastener/composite material interfaces. The reduction in these current densities in turn reduces the likelihood of the development of the internal ignition hazards of arc plasma blow-by and hot exposed fibers. The metal material may be sized to obtain a reduction in current density sufficient to prevent the onset of arc plasma formation in the interface areas.

In structures where both the possibility of lightning attachment and the presence of fuel vapor exist, the system of the invention preferably includes multipath lightning protection with each path being designed to provide full protection against lightning induced fuel ignition. The multipath approach prevents catastrophic failure of the protection system if there is a failure in one of the individual path protection techniques. Therefore, in critical areas of the aircraft, the lightning protection system of the invention preferably includes one or more additional paths of protection in combination with the foraminous metal material.

The additional protection may be provided in the form of means for preventing arc plasma blow-by from around the fastener means into an interior portion of the aircraft. For example, in a preferred embodiment of the invention, the fastener means comprises a lock bolt having an inner end portion with parallel circumferential grooves thereon. A collar is swaged around the inner end portion of the lock bolt and sealingly engages the inner end portion and an adjacent surface portion of the support structure. The provision of circumferential grooves rather than threads on the inner end of the lock bolt eliminates one of the paths along hich arc plasma blow-by occurs. The sealing engagement between the collar and the lock bolt and the support structure seals the arc plasma within the fastener interface area to thereby directly prevent arc plasma blow-by.

Another approach to providing additional paths of protection is to enhance the electrical contact between the fastener means and the fibrous material of the composite material structure. A preferred way of enhancing the electrical contact is to position a conductive sleeve around a shaft portion of the fastener that extends through a hole in the composite material structure. The sleeve is expanded in the hole to make electrical contact with portions of the fibrous material adjacent to the hole. The expanded sleeve provides uniform electrical contact with the conductive fibrous material and creates a larger flow cross-section than is achieved in conventional installations. This greatly improves the flow of current from the fastener installation into the composite material and increases the uniformity of the current density in the composite material. The more uniform dispersing of the current into the composite material prevents high current densities in individual conductive fibers and thereby prevents the ignition hazard of exposed hot fibers. The improved current flow also prevents formation of arc plasma in the fastener interface area and thereby eliminates the possibility of arc plasma blow-by.

The above-described and other advantages and features of the invention will become apparent from the detailed description of the best modes for carrying out the invention that follows.

BRIEF DESCRIPTION OF THE DRAWINGS

In the drawings, like element designations refer to like parts throughout, and

BEST MODES FOR CARRYING OUT THE INVENTION

Figures 1, 2, 3:
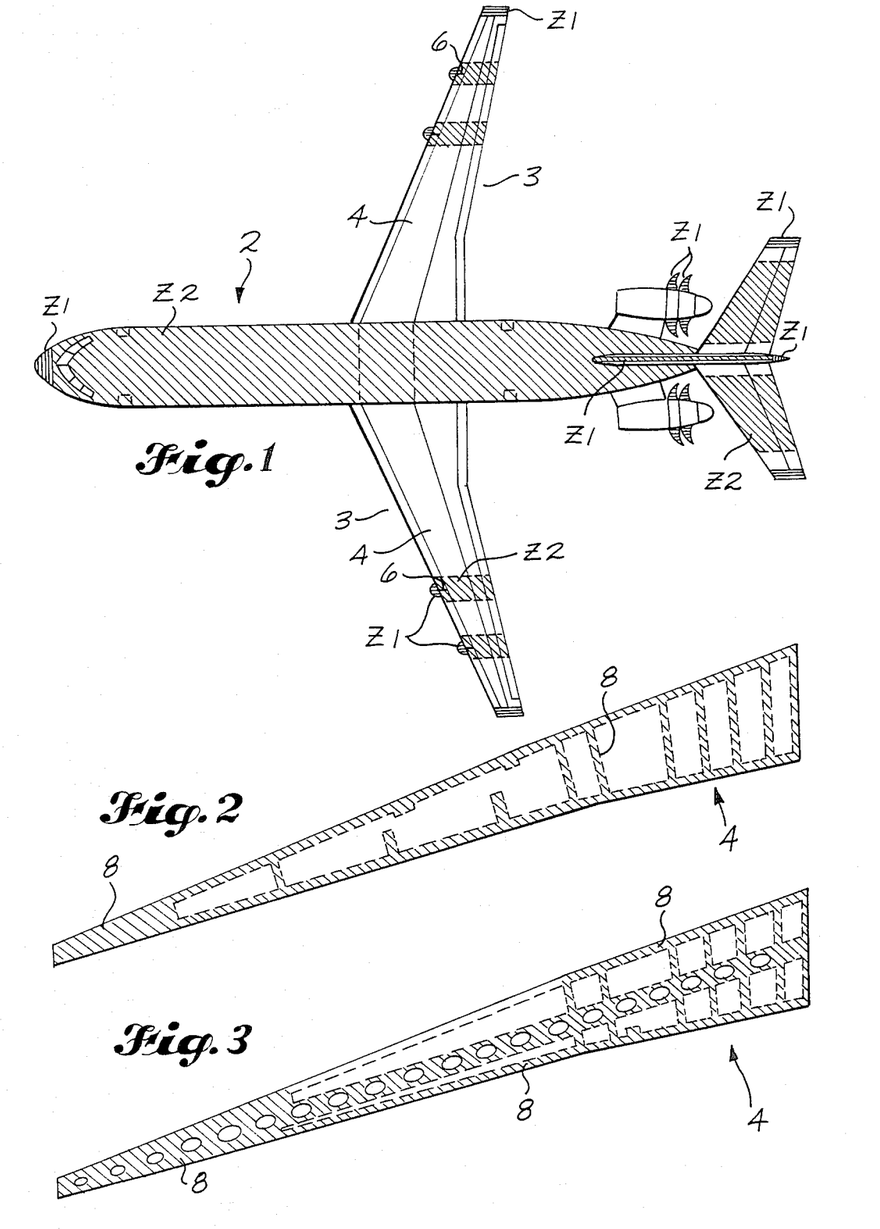
FIG. 1 is a top plan view of an aircraft, showing the lightning strike zones of the aircraft.
FIG. 2 is a top plan view of a wing box section of the aircraft shown in FIG. 1.
FIG. 3 is a bottom plan view of the wing box section shown in FIG. 2.
Figures 4, 5:
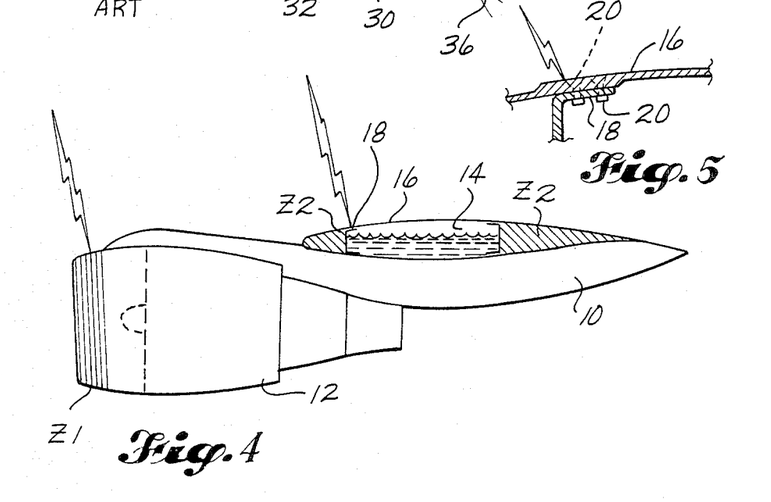
FIG. 4 is an elevational view of a wing mounted engine of another aircraft, with the wing shown in section.
FIG. 5 is an enlarged fragmentary view of a portion of the wing skin and skin support structure shown in FIG. 4.

The drawings show apparatus that is constructed according to the invention and that also constitutes the best modes for carrying out the invention currently known to the applicant. FIGS. 1-3 illustrate a type of aircraft 2 into which the system of the invention may be incorporated to advantage. FIG. 4 illustrates a wing mounted engine 12 of another aircraft and its positioning relative to a wing fuel tank 14. The aircraft 2 of FIGS. 1-3 is shown and described herein for the purpose of illustrating one type of aircraft in which the system of the invention may be used to advantage, and the structures shown in FIGS. 4 and 5 are shown and described herein for the purpose of illustrating a hazardous situation in which the system of the invention is particularly well-suited for providing lightning protection. It is of course to be understood that the system of the invention may also be used to advantage in other types of aircraft than that shown in FIGS. 1-3, and that the system of the invention is suited to protecting an aircraft in situations other than that illustrated in FIGS. 4 and 5.

FIG. 1 is a top plan view of an aircraft 2 having wings 3. FIG. 1 illustrates the lightning strike zones of the aircraft 2. Zone 1 areas are heavily shaded and are indicated by the reference character Z1. They include surfaces of the aircraft 2 where there is a high probability of direct lightning stroke attachment. These surfaces include the tip of the nose, the fan blade tips of the engines, the extremities of the empennage, the wing tips, and leading edge portions of the wings where leading edge devices cause discontinuities 6 in the leading edge. For the purposes of illustration, in FIG. 1 the zone 1 areas Z1 associated with the discontinuities 6 are shown as shaded dots projecting from the leading edge of the wings 3. There are no actual projections on the wing leading edge at the points of discontinuity 6. Zone 2 areas of the aircraft 2 are shown by diagonal shading and are designated by the reference character Z2. Zone 2 includes surfaces of the aircraft 2 for which there is a high probability of a lightning stroke being swept rearward from a zone 1 point of direct stroke attachment.

FIGS. 2 and 3 are top and bottom plan views, respectively, of the wing box section 4 of the aircraft 2. In FIGS. 2 and 3, the shaded areas indicate the portions 8 of the wing box skin that are currently anticipated to be the areas which will be provided with the lightning protection of the system of the invention. These portions 8 include all of the fastener regions in the Zone 2 surfaces, and especially the fastener areas in proximity to wing fuel tanks. The shaded portions 8 also include areas in zone 3 where attachment of a lightning stroke is possible but not highly probable. The extension of the coverage to such Zone 3 areas is desirable to ensure full protection of the critical wing fuel tank areas.

FIG. 4 illustrates a wing 10 of an aircraft of the type having a wing mounted engine 12. A portion of the wing 10 is shown in section to reveal the wing fuel tank 14, the wing skin 16, and the skin support structure 18. FIG. 5 is a detail of the area at which the skin 16 is attached to the support structure 18 by fasteners 20. FIG. 4 illustrates a stroke of lightning directly attaching to the Zone 1 front portion of the engine 12 and then being swept rearward from the Zone 1 area and attaching to one of the fasteners 20 securing the skin 16 to the support structure 18. This type of situation in which lightning attaches to a fastener extending into a fuel tank is the most critical situation addressed by the system of the invention. In this situation, ignition of fuel vapors inside the fuel tank 14 would have highly unacceptable consequences, and the attachment of the lightning to the fastener 20 can create the greatest likelihood of fuel ignition unless some means is provided to prevent such ignition.

FIG. 6 shows a fastener installation which lacks lightning protection. A fastener 28 attaches a composite material skin 24 to a composite material support structure 26. The fastener installion is of the clearance fit type discussed above. In order to avoid damage to the composite material during installation of the fastener 28, there is a small amount of clearance between the fastener shaft and the sidewall of the holes in the composite material skin 24 and support structure 26. The fastener 28 is removable and has threads 30 on its inner end which are engaged by a nut 32.

When lightning strikes the fastener 28, arc plasma 34 develops in the clearance between the fastener shaft and the composite material structures 24, 26 and also at the interface between the support structure 26 and the nut 32. FIG. 6 illustrates the situation when the pressure of the arc plasma 34 in the clearance area has reached a level sufficient to blow the arc plasma 34 out along the path provided by the threads 30 and through the interface between the structure 26 and the nut 32. The arc plasma blow-by is indicated by the reference numeral 36. It should be noted that FIG. 6 does not show any arc plasma 34 being generated in the countersink 38 of the skin 24 since there is generally sufficiently good contact between the fastener head and the countersink 38 to prevent the development of any significant arc plasma in the countersink 38. It should also be noted that, if the support structure 26 were metal rather than a composite material, a tighter fit between the fastener 28 and the support structure 26 could be provided, and there would be improved current flow between the fastener 28 and the support structure 26 and a consequent reduction of arc plasma generation between such members. However, the generation of arc plasma between the fastener 28 and the composite material skin 24 would still present a danger of arc plasma blow-by.

Figure 7:
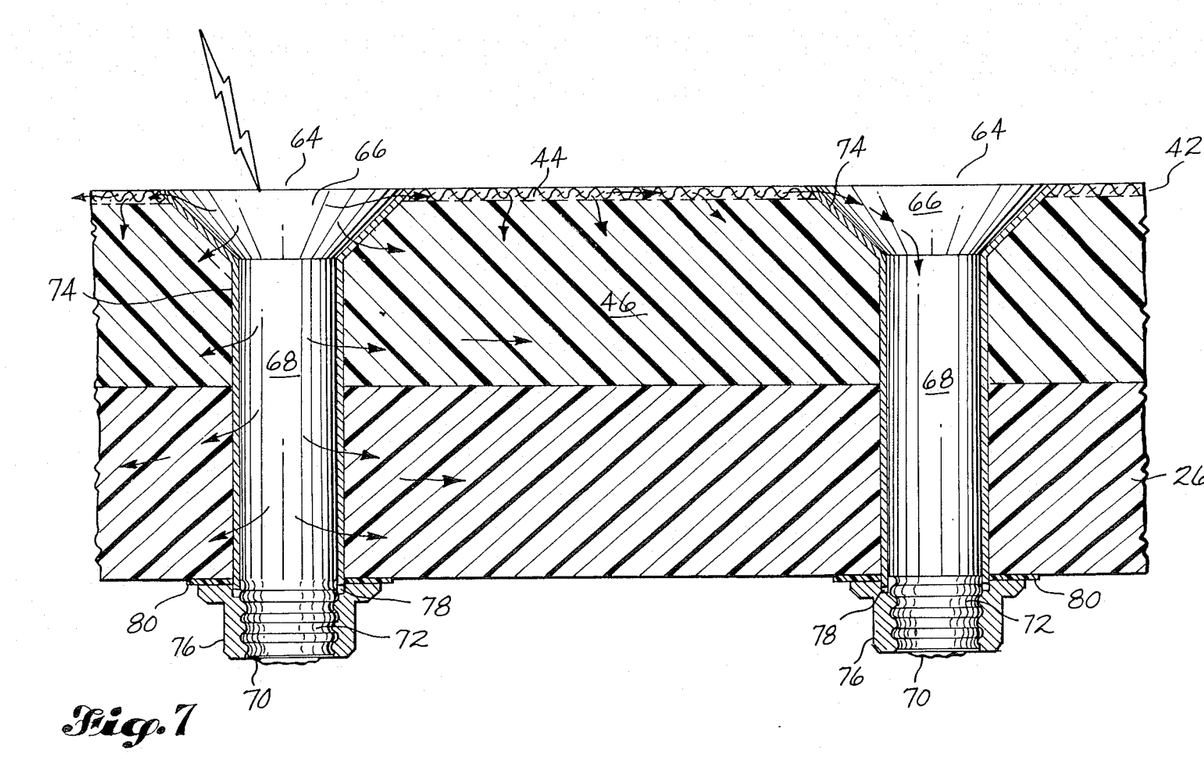
FIG. 7 is a sectional view of a preferred embodiment of the system of the invention, with the fasteners shown in elevation.

The lightning protection system of the invention is designed to protect against the type of hazard illustrated in FIG. 6 and the other types of hazards and damage discussed above. FIG. 7 illustrates a preferred embodiment of the invention that is especially suited for use in situations such as that illustrated in FIGS. 4 and 5. In FIG. 7, a composite material skin 42 is shown attached to a composite material support structure 26 by means of two permanent fasteners 64. The skin 42 and the support structure 26 may be made from a variety of materials, such as graphite fiber reinforced epoxy resins. The fasteners 64 are made from a conductive metal. The skin 42 includes graphite epoxy layers 46 and an outer layer with an epoxy resin matrix in which a foraminous metal material 44 is embedded. The resin matrix of the outer layer is an integral continuation of the matrix of the inner layers 46, and when the composite material skin 42 is fabricated, all of the layers are cured together. The reinforcing conductive graphite fibers of the layers 46 provide predetermined required load-carrying characteristics in a known manner.

The foraminous metal material 44 is positioned outwardly of the graphite fibers in the outer layer of the skin 42 which will be subject to attachment of lightning. The metal material 44 forms interconnecting electrical pathways to disperse current from lightning over the outer layer of the skin 42 and is in direct electrical contact with the graphite fibers of the layers 46 to disperse current throughout the skin 42. The direct electrical contact does not necessarily require direct physical contact and is achieved simply by curing all of the layers of the skin 42 together. The metal material 44 is sufficiently proximate to the fasteners 64 to divert current from lightning that attaches to one of the fasteners 64 away from such fastener 64 and to cause current from lightning that attaches to one of the fasteners 64 to be shared by the other fastener 64 and any additional fasteners (not shown) in the area covered by a continuation of the metal material 44. It is not necessary that the fasteners 64 be in actual physical contact with the metal material 44. As long as the fastener heads 66 extend through the outer layer containing the metal material 44 and the metal material 44 is very close to the fastener heads 66, the metal material 44 will conduct sufficient current from the fasteners 64 to provide a significant reduction in the current density between the fastener shaft 68 and the skin 42 and support structure 26 and significant current sharing between fasteners 64. The current paths are indicated by arrows in FIG. 7.

The metal material 44 may include various metals. What is required is that the metals be more conductive than the reinforcing fibers in inner layers 46 and galvanically compatible with such fibers. It is also desirable to choose the metal and to dimension the metal material 44 to maximize the conductivity per unit weight of the metal material 44 and minimize the weight of the outer layer of the skin 42. In most installations, copper is the preferred metal. Copper is galvanically compatible with graphite, has a high level of conductivity, and is fairly lightweight. Aluminum is generally not suitable because of its galvanic incompatibility with graphite fibers, and nickel is not preferred because of its relatively low conductivity compared to copper. In general, the metal material 44 would preferably consist entirely of copper. However, if corrosion of the copper due to exposure to the outside environment might be a problem, the copper may be plated with a very thin layer of nickel.

Figure 8:
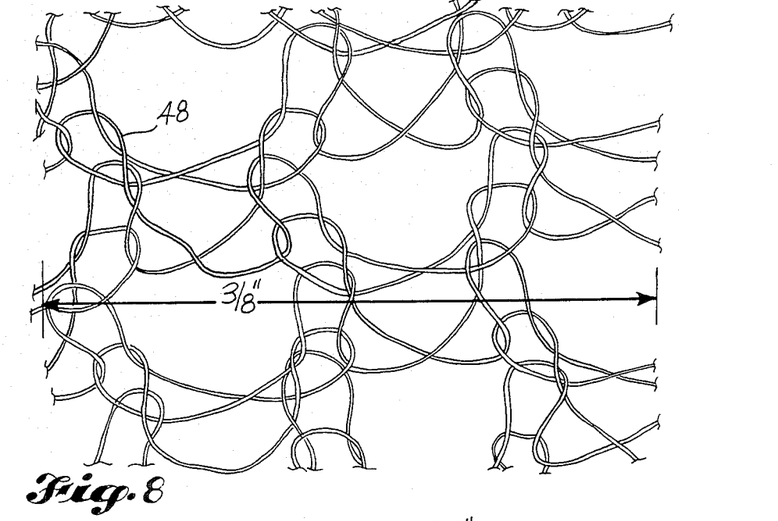
FIG. 8 is an enlarged plan view of a preferred embodiment of the foraminous metal material comprising knitted wire.
Figures 9, 10, 11:
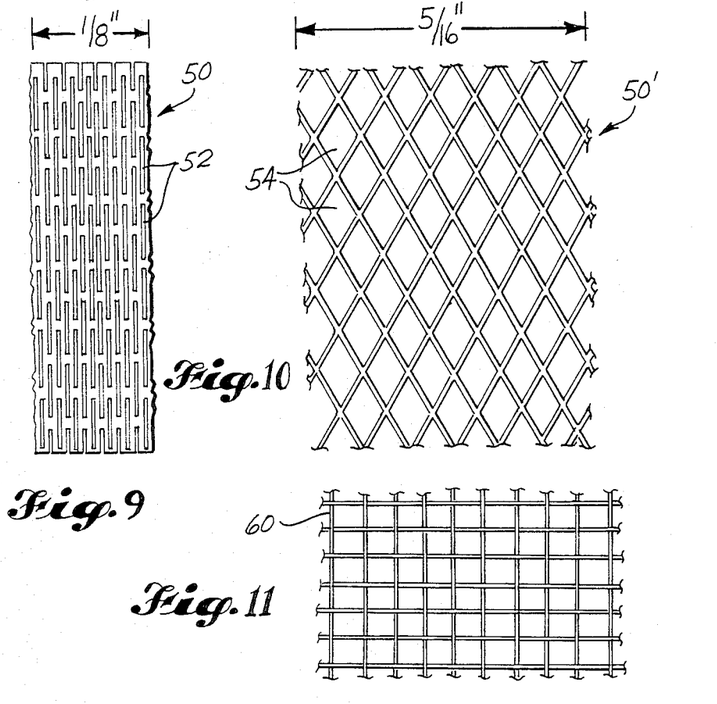
FIG. 9 is an enlarged plan view of a thin metal sheet having a number of slits therein.
FIG. 10 is an enlarged plan view of another preferred embodiment of the foraminous metal material comprising the metal sheet shown in FIG. 9 expanded into an open grid configuration.
FIG. 11 is an enlarged plan view of still another preferred embodiment of the foraminous metal material comprising woven metal wire.

FIGS. 8-11 illustrate three different preferred embodiments of the metal material 44 each of which may be provided in a single or a plurality of plies of metal. FIG. 8 shows knitted copper wire 48 that forms a multiplicity of interconnected loops to provide the required interconnecting electrical pathways. FIG. 11 shows woven copper wire 60. FIG. 9 shows a very thin sheet 50 of copper having a multiplicity of slits 52. FIG. 10 shows the sheet 50 of FIG. 9 expanded or stretched in its plane to form an open grid 50' having interconnected pathways formed by the copper of the sheet 50 and apertures 54 formed by the expanded slits 52. The choice between a knitted, woven, or expanded sheet configuration or some other configuration would be dictated by the particular needs of a particular situation. At the present time, it is anticipated that a knitted wire configuration will be the type of configuration that is primarily used in the system of the invention.

The system of the invention may have only a single path of lightning protection in situations where lightning induced hazards are not critical. However, as noted above, in critical areas where there is a hazard of lightning induced ignition of fuel, it is desirable to have multiple paths of lightning protection each of which is designed to provide full protection. FIG. 7 illustrates three types of protection. The outer layer containing the metal material 44 described above conducts current away from the fasteners 64 to reduce the current density at the fastener/composite material interfaces. The amount of metal in the material 44 and the conductivity thereof is preferably sufficient to reduce the current densities around the fasteners 64 an amount sufficient to prevent arc plasma blow-by or fiber glow. It should be noted that the level of conductivity required is generally lower than that required to protect the composite material skin 42 against surface damage. Therefore, if surface damage is not a problem, the metal material 44 and the outer layer containing such material 44 may be made even more lightweight.

The other two paths of lightning protection illustrated in FIG. 7 are means for enhancing electrical contact between the fasteners 64 and the graphite fibers of the inner skin layers 46 and the support structure 26, and means for preventing arc plasma blow-by from around the fasteners 64 into an interior portion of the aircraft. The electrical contact may be improved in a variety of ways, including installing a tension head fastener to increase the countersink area, and installing the fasteners wet with a conductive sealant such as a silver conductive sealant. The preferred and most effective means of improving the electrical contact is that illustrated in FIG. 7. Therein, a conductive sleeve 74 surrounds the head 66 and the shaft 68 of each fastener 64 and is expanded in the holes formed in the skin 42 and the support structure 26 for receiving the fasteners 64. The expanding of the sleeves 74 creates good uniform electrical contact between the sleeve 74 and the graphite fibers of the skin layers 46 and support structure 26 adjacent to the holes. The fastener 64 is permanently installed and has a very tight fit with the sleeve 74. Thus, there is good current flow from the shaft 68 into the graphite of the composite structures 26, 46, and no arc plasma is generated in the fastener hole area. The arrows in FIG. 7 illustrate the current flow.

Arc plasma blow-by may also be prevented in a variety of ways. For example, a tank sealant might be provided over the inner end of the fastener and a collar securing the fastener in place. This method has the disadvantage of being very difficult to inspect. Therefore, the preferred method of preventing arc plasma blow-by is to create a seal at the inner end of the fastener by means of a collar/lock bolt installation. Each of the fasteners 64 shown in FIG. 7 is a lock bolt 64 having an inner end portion 70 with parallel circumferential grooves 72 thereon. The provision of parallel grooves 72 instead of spiral threads eliminates the spiral passageway for escape of arc plasma that exists on the inner threaded ends of threaded fasteners. A collar 76 is swaged around the inner end portion 70 of the lock bolt 64 and sealingly engages the grooves 72 and adjacent surface portions of the support structure 26. The collar 76 seals the end of the fastener 64 to prevent arc plasma from escaping into the interior of the aircraft. The collar 76 has an annular recess 78 for accommodating the inner end of the sleeve 74. Preferably, a washer 80 insulates the sealing engagement between the collar 76 and the support structure 26 to prevent current flow from the collar 76 to the support structure 26 and the formation of arc plasma around the outer perimeter of the collar 76. The washer 80 is extremely thin with a thickness of about 0.010 inches and is really more of a dielectric film than a washer. Forms of insulation other than a dielectric washer may also be used.

Figures 19, 20, 21, 22, 23:
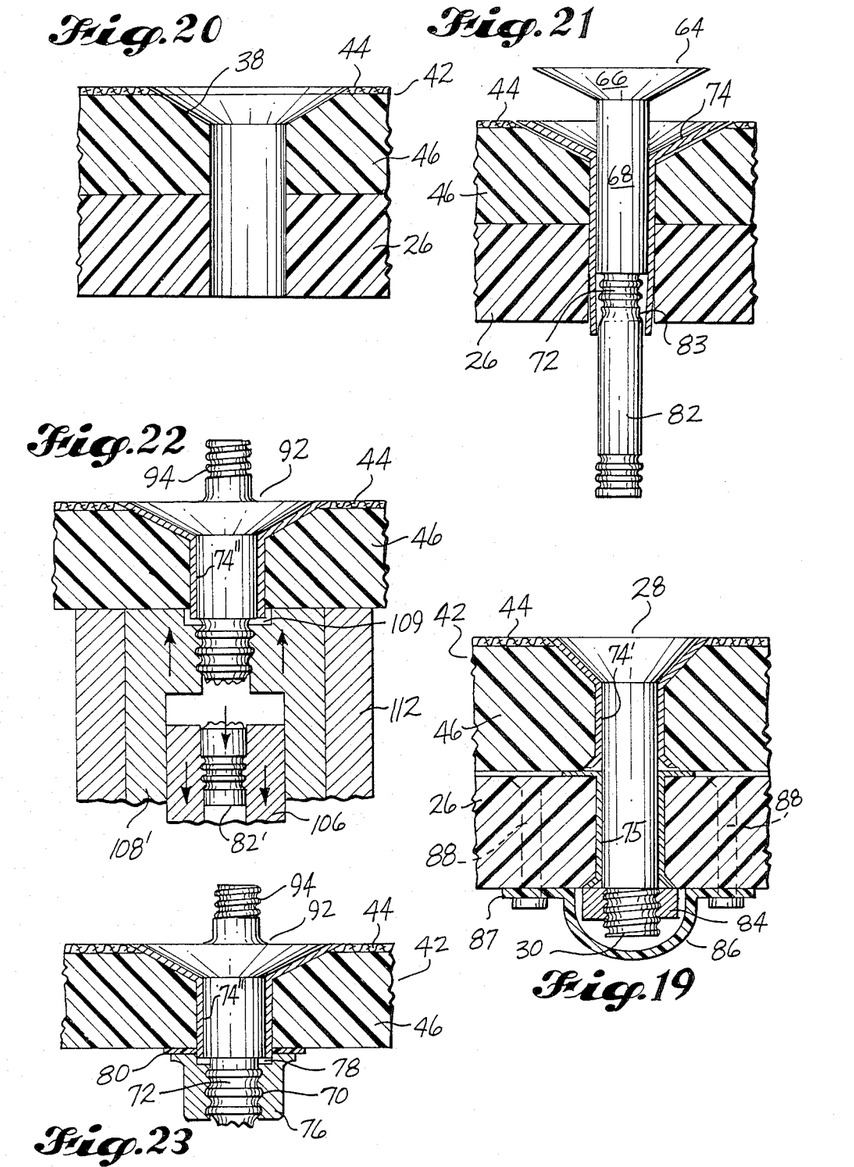
FIG. 19 is a sectional view of the preferred embodiment of a completed removable fastener installation, with the fastener shown in elevation.
FIGS. 20 and 21 are sectional views illustrating the sleeve and permanent fastener installation process, with parts shown in elevation.
FIG. 22 is a sectional view illustrating the process of permanently installing a sleeve and a ground stud, with the stud shown in elevation.
FIG. 23 is like FIG. 22 except that it shows the stud fully installed.

In the system of the invention, it is contemplated that there will be ground studs required within the areas protected by the outer layer containing the metal material 44. When such ground studs are required, it is preferable that they be provided with the same types of protection as the fasteners 64. FIG. 23 illustrates a ground stud 92 that is permanently installed in the composite material skin 42 and is separate from the support structure 26. The ground stud 92 has a threaded ground connection portion 94 that projects outwardly from the metallized outer layer of the composite material 42. The ground stud 92 extends through the skin 42, and the hole in the skin 42 that receives the ground stud 92 has therein a conductive sleeve 74" that surrounds the head and shaft of the ground stud 92. The sleeve 74" is expanded in the hole in the skin 42 to make good electrical contact with the graphite fibers adjacent to the hole. The sleeve 74" is of the same type as the sleeves 74 shown in FIG. 7, with the main difference being that the shaft of the sleeve 74" is shorter since it extends through the skin 42 only. The inner end portion 70 of the ground stud 92 has parallel grooves 72 thereon that are engaged by a collar 76 which is swaged to seal the ground stud inner end in the manner described above in connection with the lock bolt 64.

FIG. 19 illustrates the use of a threaded removable fastener 28 in the system of the invention. A sleeve 74' is expanded in the hole in the composite material skin 42 and surrounds the fastener head and the portion of the fastener shaft extending through the skin 42. Another sleeve 75 is expanded in the hole in the composite material support structure 26 and surrounds the portion of the fastener shaft that extends through the hole in structure 26. In this embodiment, the current enhancing means is provided in the form of two sleeves 74', 75 rather than the single sleeve 74 of the embodiment shown in FIG. 7 because the portion of the skin 42 engaged by the fastener 28 is part of a structure, such as an access panel, that is required to be removable.

Since the fastener 28 must be removable and has threads 30 on its inner end, it cannot be provided with a swaged collar 76 as in the embodiment shown in FIG. 7. Therefore, a dielectric cap 86 is provided around the inner threaded end of the fastener 28 and the nut 84 holding the fastener 28 in position. The cap 86 surrounds the nut 84 and has a peripheral flange 87 that is fastened to the support structure 26 by fasteners 88 to securely and permanently position the cap 86 with respect to the support structure 26. Preferably, a sealant is provided around the outer periphery of the flange 87 to securely seal the interface of the cap 86 and the support structure 26. The nut 84 is prevented from rotating within the cap 86 by suitable means, not shown. There is no need to prevent movement of the nut 84 toward the bottom of the cap 86 since insertion and tightening of the fastener 28 will automatically move the nut 84 up into place against the support structure 26. The fasteners 88 may be metal or, if there is a sparking hazard, a dielectric material. In a situation in which the support structure 26 is metal rather than a composite material, the inner nonflush sleeve 75 may sometimes be omitted without unacceptably compromising the lightning protection.

Figure 12:
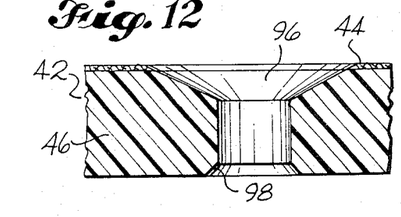
FIGS. 12-18 are sectional views illustrating the sleeve installation process for a removable fastener, with parts shown in elevation.
Figure 13:
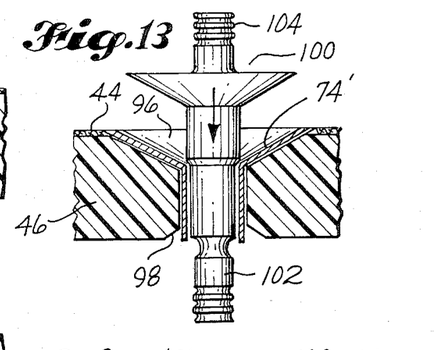
Figure 14:
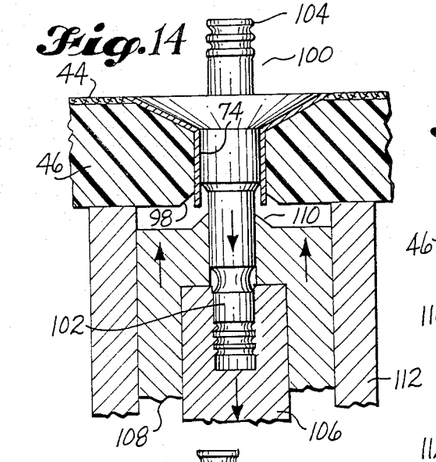
Figure 15:
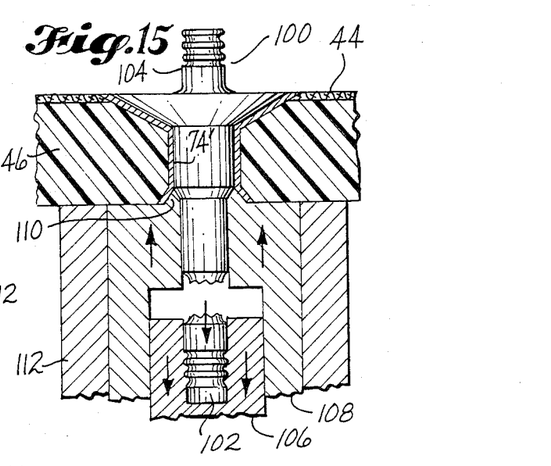
Figure 16:
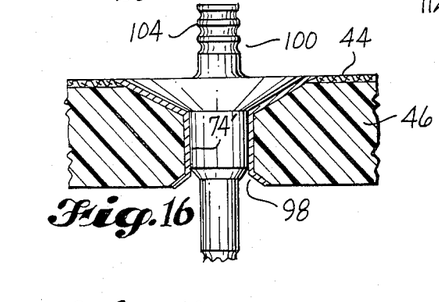
Figure 17:
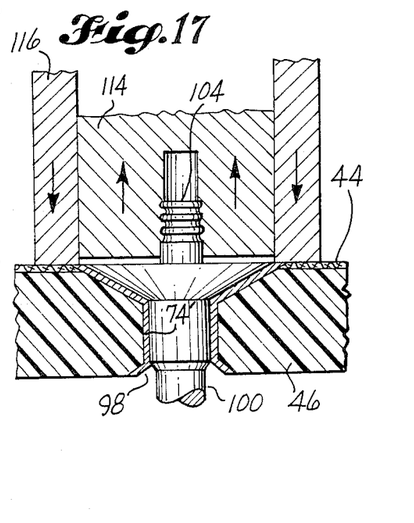
Figure 18:
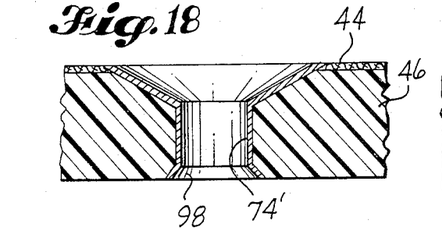

FIGS. 12-18 illustrate the installation of the sleeve 74' shown in FIG. 19. The composite material skin 42 is provided with a hole 96 for receiving the sleeve 74'. The hole 96 has an internal countersink 98. FIG. 12 shows the skin 42 with the hole 96 formed therein. Referring to FIG. 13, the unexpanded sleeve 74' is positioned in the hole 96, and then the shank of an expanding tool 100 is inserted into the sleeve 74 until an inner breakoff portion 102 of the tool 100 extends from the inner end of the hole 96. Referring to FIG. 14, the breakoff portion 102 is then engaged by a pulling member 106 to pull the tool 100 down into the hole 96 and cause an enlarged diameter portion of the tool 100 to expand the sleeve 74'. As the pull member 106 is pulling the tool 100, a housing 112 of the expanding apparatus engages the inner surface of the skin 42 for stability, and a push member 108 moves upwardly toward the inner surface of the skin 42. The push member 108 has an annular frustoconical projection 110 that moves up into the internal countersink 98 and forces the inner end of the sleeve 74' to flare out against the sidewall of the countersink 98. This flaring out of the inner end of the sleeve 74' permanently installs the sleeve 74' and prevents the sleeve 74' from being moved out of position when the tool 100 is removed. FIG. 14 illustrates the push member 108 moving toward the countersink 98, and FIG. 15 illustrates the projection 110 in the countersink area pressing the inner end of the sleeve 74' against the countersink 98. As illustrated in FIG. 15, when the sleeve has been correctly positioned, the pull member 106 continues to pull on the tool 100 causing it to fracture along a reduced diameter portion. FIG. 16 shows the sleeve 74' fully installed with the tool 100 still in place inside the expanded sleeve 74' and the push-/pull mechanism 106, 108 removed. FIG. 17 illustrates the removal of the tool 100. A pull member 114 engages and pulls on an outer projection 104 of the tool 100 while a push member 116 pushes back against the outer surface of the skin 42. This removes the tool 100 from the skin 42 and leaves the sleeve 74' correctly positioned, as shown in FIG. 18.

FIGS. 20 and 21 illustrate the installation of the sleeve 74 and lock bolt 64 shown in FIG. 7. As shown in FIG. 21, the tool 100 is replaced by a tool that includes the lock bolt 64 and a breakoff portion 82 attached to the lock bolt 64 by a reduced diameter portion 83. Since the lock bolt 64 is to be permanently installed, there is no need to remove a tool and so there is no need to provide an internal countersink or to flare out the inner end of the sleeve 74. In other respects, the installation of the sleeve 74 and the lock bolt 64 are substantially the same as the installation illustrated in FIGS. 12-16.

FIGS. 22 and 23 illustrate the permanent installation of a ground stud 92. Like the lock bolt 64 and the tool 100, the ground stud 92 has a breakoff portion 82'. The sleeve 74" and the ground stud 92 are installed using a pull member 106 and a push member 108' that is like the pull member 108 shown in FIGS. 14 and 15, except that instead of a projection 110, the push member 108' has a recess 109 for accommodating the inner end of the sleeve 74".

It will be obvious to those skilled in the art to which this invention is addressed that the invention may be used to advantage in a variety of situations. Therefore it is also to be understood by those skilled in the art that various changes, modifications, and omissions in form and detail may be made without departing from the spirit and scope of the invention as defined by the following claims.

What is claimed is:

1. In an aircraft, a lightning protection system comprising the combination of:
   an internal support structure;
   a composite material structure including an integral resin matrix, reinforcing conductive fibrous material embedded in said matrix, said fibrous material being sufficiently strong to provide predetermined load-carrying characteristics, and a foraminous metal material embedded in said matrix and positioned outwardly of said fibrous material in an outer layer of the composite material structure that will be subject to attachment of lightning; said metal material being more conductive than and galvanically compatible with said fibrous material, forming interconnecting electrical pathways to disperse current from lightning over said outer layer of the composite material structure, being in direct electrical contact with said fibrous material to disperse current throughout the composite material structure, and being dimensioned to help maximize the conductivity per unit weight and minimize the weight of said outer layer; and
   conductive fastener means for securing the composite material structure to the support structure; said fastener means having outer portions that will be subject to attachment of lightning, and said fastener means being in electrical contact with said fibrous material;
   said metal material being sufficiently proximate to the fastener means to divert current from lightning that attaches to the fastener means away from the fastener means to reduce current densities between the fastener means and the composite material structure and thereby prevent arc plasma blow-by and fiber glow.

2. A structure as recited in claim 1, in which said fibrous material comprises graphite fibers, and said metal material consists essentially of copper.

3. A structure as recited in claim 1, in which said fibrous material comprises graphite fibers, and said metal material comprises knitted copper wire.

4. A structure as recited in claim 1, in which said fibrous material comprises graphite fibers, and said metal material comprises woven copper wire.

5. A structure as recited in claim 1, in which said fibrous material comprises graphite fibers, and said metal material comprises an expanded copper sheet.

6. A system as recited in claim 1, in which said fastener means comprises a plurality of conductive fasteners, and said metal material forms interconnecting electrical pathways that are sufficiently proximate to said fasteners to cause current from lightning that attaches to one of the fasteners to be shared by the other fasteners.

7. A system as recited in claim 1, further comprising means for sealing inner end portions of the fastener means to prevent arc plasma blow-by from around the fastener means into an interior portion of the aircraft.

8. A system as recited in claim 1, in which said fastener means comprises a lock bolt having an inner end portion with parallel circumferential grooves thereon, and a collar that is swaged around said inner end portion and sealingly engages said inner end portion and an adjacent surface portion of said support structure.

9. A system as recited in claim 1, further comprising means for enhancing electrical contact between said fastener means and said fibrous material.

10. A system as recited in claim 9, in which said fastener means comprises a fastener having a shaft portion extending through a hole in said composite material structure, and said means for enhancing comprises a conductive sleeve that surrounds said shaft portion and is expanded in the hole to make electrical contact with portions of said fibrous material adjacent to the hole.

11. A system as recited in claim 10, further comprising means for sealing inner end portions of the fastener means to prevent arc plasma blow-by from around the fastener means into an interior portion of the aircraft.

12. A system as recited in claim 10, further comprising a ground stud having a ground connection portion projecting outwardly from said outer layer of said composite material structure, and a shaft portion extending through a hole in said composite material structure; and means for enhancing electrical contact between the ground stud and said fibrous material, said means for enhancing including a conductive sleeve that surrounds said shaft portion and is expanded in the hole to make electrical contact with portions of said fibrous material adjacent to the hole.

13. A system as recited in claim 9, further comprising means for sealing inner end portions of the fastener means to prevent arc plasma blow-by from around the fastener means into an interior portion of the aircraft.

14. In an aircraft, a lightning protection system comprising the combination of:
an internal support structure;
a composite material structure including an integral resin matrix, reinforcing conductive fibrous material embedded in said matrix, said fibrous material being sufficiently strong to provide predetermined load-carrying characteristics, and a foraminous metal material embedded in said matrix and positioned outwardly of said fibrous material in an outer layer of the composite material structure that will be subject to attachment of lightning; said metal material being more conductive than and galvanically compatible with said fibrous material, forming interconnecting electrical pathways to disperse current from lightning over said outer layer of the composite material structure, being in direct electrical contact with said fibrous material to disperse current throughout the composite material structure, and being dimensioned to help maximize the conductivity per unit weight and minimize the weight of said outer layer;
conductive fastener means for securing the composite material structure to the support structure; and
means for enhancing electrical contact between said fastener means and said fibrous material;
said metal material being sufficiently proximate to the fastener means to divert current from lightning that attaches to the fastener means away from the fastener means; and
said fastener means comprising a lock bolt having an inner end portion with parallel circumferential grooves thereon, and a collar that is swaged around said inner end portion and sealingly engages said inner end portion and an adjacent surface portion of said support structure.

15. In an aircraft, a lightning protection system comprising the combination of:
an internal support structure;
a composite material structure including an integral resin matrix, reinforcing conductive fibrous material embedded in said matrix, said fibrous material being sufficiently strong to provide predetermined load-carrying characteristics, and a foraminous metal material embedded in said matrix and positioned outwardly of said fibrous material in an outer layer of the composite material structure that will be subject to attachment of lightning; said metal material being more conductive than and galvanically compatible with said fibrous material, forming interconnecting electrical pathways to disperse current from lightning over said outer layer of the composite material structure, being in direct electrical contact with said fibrous material to disperse current throughout the composite material structure, and being dimensioned to help maximize the conductivity per unit weight and minimize the weight of said outer layer;
conductive fastener means for securing the composite material structure to the support structure; and
means for enhancing electrical contact between said fastener means and said fibrous material;
said metal material being sufficiently proximate to the fastener means to divert current from lightning that attaches to the fastener means away from the fastener means;
said fastener means comprising a fastener having a shaft portion extending through a hole in said composite material structure, and said means for enhancing comprising a conductive sleeve that surrounds said shaft portion and is expanded in the hole to make electrical contact with portions of said fibrous material adjacent to the hole; and
said fastener having an inner end portion with parallel circumferential grooves thereon, and said fastener means including a collar that is swaged around said inner end portion and sealingly engages said inner end portion and an adjacent surface portion of said support structure.

16. In an aircraft, a lightning protection system comprising the combination of:
an internal support structure;
a composite material structure including an integral resin matrix, reinforcing conductive fibrous material embedded in said matrix, said fibrous material being sufficiently strong to provide predetermined load-carrying characteristics, and a foraminous metal material embedded in said matrix and positioned outwardly of said fibrous material in an outer layer of the composite material structure that will be subject to attachment of lightning; said metal material being more conductive than and galvanically compatible with said fibrous material, forming interconnecting electrical pathways to disperse current from lightning over said outer layer of the composite material structure, being in direct electrical contact with said fibrous material to disperse current throughout the composite material structure, and being dimensioned to help maximize the conductivity per unit weight and minimize the weight of said outer layer; and conductive fastener means for securing the composite material structure to the support structure; said fastener means comprising a lock bolt having an inner end portion with parallel circumferential grooves thereon, and a collar that is swaged around said inner end portion and sealingly engages said inner end portion and an adjacent surface portion of said support structure;

said metal material being sufficiently proximate to the fastener means to divert current from lightning that attaches to the fastener means away from the fastener means.

17. A system as recited in claim 16, further comprising a ground stud having a ground connection portion that projects outwardly from said outer layer of said composite material structure, a shaft portion that extends through said composite material structure, and an inner end portion with parallel circumferential grooves thereon; and a collar swaged around said inner end portion of the ground stud and sealingly engaging said inner end portion of the ground stud and an adjacent surface portion of said composite material structure.

* * * * *

UNITED STATES PATENT AND TRADEMARK OFFICE
CERTIFICATE OF CORRECTION

PATENT NO. : 4,755,904
DATED : July 5, 1988
INVENTOR(S) : Rowan O. Brick

It is certified that error appears in the above-identified patent and that said Letters Patent are hereby corrected as shown below:

Column 7, line 18, "hich" should be -- which --.

Claim 8, column 15, line 18, "1" should be -- 7 --.

Signed and Sealed this

Seventh Day of March, 1989

Attest:

DONALD J. QUIGG

Attesting Officer

Commissioner of Patents and Trademarks